2,723,181
Patented Nov. 8, 1955

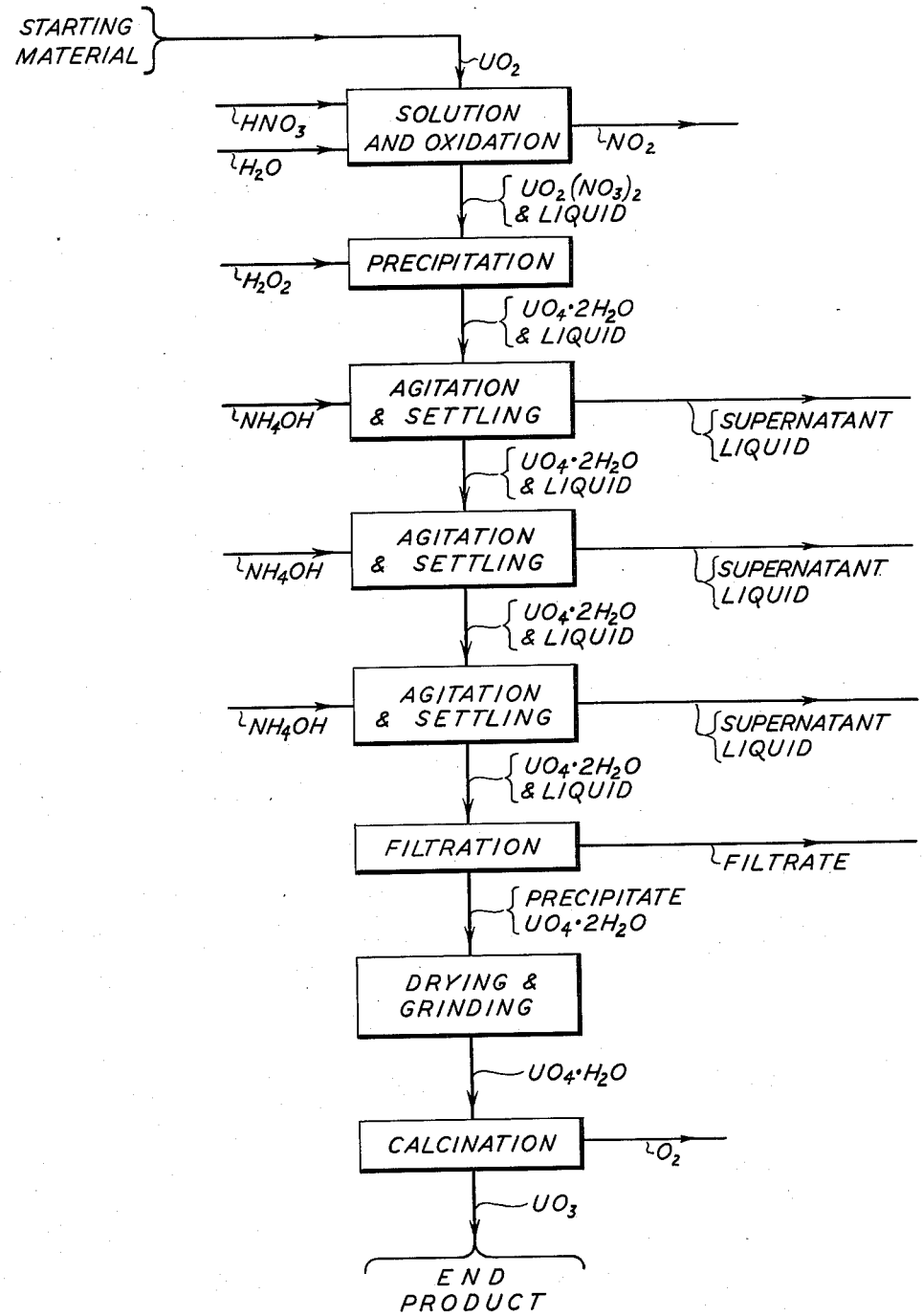

2,723,181

PROCESSES OF PRODUCING URANIUM TRIOXIDE

Clarence E. Larson, Oak Ridge, Tenn., assignor to the United States of America as represented by the United States Atomic Energy Commission Application May 26, 1944, Serial No. 537,516

8 Claims. (Cl. 23—14.5)

This invention relates to the manufacture of uranium trioxide, especially its preparation in a state whereby it reacts rapidly with carbon tetrachloride. More particularly it appertains to the employment of ammonium hydroxide in the production of the uranium tetraoxide which is subsequently converted to uranium trioxide.

A need for uranium tetra, penta and hexachloride in large quantities exists in industry. Carbon tetrachloride reacts with uranium trioxide to form these several chlorides and both source materials are readily obtained at reasonable costs. Unfortunately the yields from this reaction have been so low that the process has been a mere laboratory curiosity. Various expedients, such as (1) preparation of the trioxide by different chemical processes, for example, that of Rosenheim and Daehr (Zeit. Anorg. Chemie, 1929, vol. 181, page 178), and (2) screening and employment of trioxide of different degrees of fineness, have not given significant differences in results.

This invention has for an object the preparation of uranium trioxide in a state enabling it to react satisfactorily with carbon tetrachloride. Other objects are to prepare uranium trioxide and uranium tetraoxide. Further objects are to prepare uranium tetraoxide from a uranium compound in such a state that it can be converted to a very reactive form of uranium trioxide and to treat uranium tetraoxide with ammonium hydroxide. Still further objects are to prepare and/or wash uranium tetraoxide in the presence of ammonium hydroxide solutions and control the chemical and/or physical state of uranium tetraoxide by slurrying with aqueous ammonium hydroxide. A general advance in the art and other objects which will appear hereinafter are also contemplated.

It has now been found that treatment of uranium tetraoxide slurries or suspensions with aqueous ammonium hydroxide gives a material which upon heating yields a uranium trioxide capable of rapid and complete reaction with carbon tetrachloride.

How the foregoing objects and related ends are accomplished will be apparent from the following exposition in which are disclosed the principle, the organization and divers embodiments of the invention, including the best mode contemplated for carrying out the same. Parts are given by weight throughout the written description, and it is amplified by the accompanying drawing which shows a flow diagram of the preferred operations.

Example I

Enough water to make a thin paste was added to 1000 parts of uranium dioxide in a glass lined vessel and the resultant stirred until uniform. Then 1410 parts of nitric acid (69% $HNO_3$) were added cautiously. The fumes given off, being pernicious and noxious were drawn away as fast as formed. The reaction mass was boiled until all nitrogen dioxide ($NO_2$) fumes had been expelled.

Crystals of uranyl nitrate, probably uranyl nitrate hexahydrate $UO_2(NO_3)_2 \cdot 6H_2O$, usually form in the boiling liquid and the boiling may, if desired, be stopped when their presence is noted.

After the boiling, the preparation was diluted until the mixture contained 660 parts of uranyl nitrate $$[UO_2(NO_3)_2]$$

per liter and the temperature of the liquid brought to 70° C. whereupon 907 parts of 30% hydrogen peroxide were added.

At this stage the reaction mass containing uranium tetraoxide, probably the dihydrate $UO_4 \cdot 2H_2O$, is a smooth yellowish white precipitate or suspension similar in appearance and consistency to mayonnaise.

The preparation was then thinned gradually by adding four times its volume of ammonia water. The ammonia solution used was made by combining concentrated $NH_4OH$ (28% by weight), and $H_2O$ in the ratio 1:19 by volume. The preparation was kept uniform throughout, particularly during the initial doubling of its volume, by efficient stirring. If all the ammonia water is added at once it is difficult to get efficient stirring.

The resultant product was then diluted with one and one-half times its volume of water, stirred to uniformity and allowed to settle. After three hours (usually three to four hours is adequate settling time) the supernatant liquid was siphoned off and an equal volume of ammonia water (20 cc. concentrated $NH_4OH$, per liter of water) added. The resultant was stirred to mix thoroughly, allowed to stand three hours and the clear liquid again siphoned off. This last washing operation was repeated and the sediment filtered on a Büchner type funnel.

Continued washing causes the precipitate to settle more and more slowly. This causes some delay in filtering but does no harm to the chemical features of the procedure or reactivity of the product. Experience has shown that a filter cake about one inch thick is desirable for the subsequent manipulations and handling.

The filter cake of uranium tetraoxide was dried in porcelain pans or trays for 12 to 16 hours at 70° to 80° C., producing possibly the monohydrate $UO_4 \cdot H_2O$. The dried cakes were crushed to powder in a mortar type pulverizer.

If the drying has not been done correctly it is difficult to get a smooth powder at this stage. Drying too long gives a cake which is too hard. Insufficient drying gives a cake which packs in grinding.

The dry powder was placed in a glass lined container, connected to a vacuum pump and raised to and maintained at 200° C. until most of the water was driven off. The temperature was then gradually raised to 325° C. and there maintained for one to two hours and allowed to cool, whereby uranium trioxide in the from of a very reactive red powder resulted. This $UO_3$ powder was transferred to a dry storage vessel as rapidly as possible to minimize contact with moist air.

Example II

A thin paste was made by adding water to 1000 parts of uranium dioxide and stirring. Then 1946 parts of nitric acid (50% $HNO_3$) were added slowly. The fumes given off were drawn away rapidly while boiling the reaction mass to expel all nitrogen dioxide ($NO_2$) fumes.

The preparation was diluted until the mixture contained 660 parts of uranyl nitrate $[UO_2(NO_3)_2]$ per liter and the temperature of the liquid brought to 75° C. whereupon 908 parts of 30% hydrogen peroxide were added.

The preparation was then thinned slowly by adding four times its volume of concentrated ammonium hydroxide (28%) diluted with 19 times its volume of water. The preparation was kept uniform throughout by efficient stirring.

The resultant product was then diluted with an equal volume of water, stirred to uniformity and allowed to settle. After four hours the supernatant liquid was siphoned off and an equal volume of ammonia water (20 cc. concentrated NH4OH per liter of water) added. The resultant was stirred thoroughly, allowed to stand approximately three hours and the clear liquid again siphoned off. The washing operation was repeated and the sediment filtered on a Büchner type funnel.

The filter cake was dried in porcelain pans or trays for 15 hours at 75° C. The dried product was crushed to powder.

The dry powder was placed in a glass container under vacuum and raised to and maintained at 200° C. until most of the water was driven off. The temperature was then slowly raised to 325° C. and there maintained for one to two hours and allowed to cool, resulting in a highly reactive form of $UO_3$.

*Example III*

Enough water to make a thin paste was added, with agitation, to 1000 parts of uranium dioxide in a glass vessel. Then 1622 parts of nitric acid (60% $HNO_3$) were added. The reaction mass was boiled to expel all nitrogen dioxide ($NO_2$) and the fumes were drawn away as fast as formed.

The preparation was then diluted until the mixture contained 660 parts of uranyl nitrate $[UO_2(NO_3)_2]$ per liter and the temperature of the liquid to 78° C. whereupon 908 parts of 30% hydrogen peroxide were added.

The preparation was then thinned by adding four times its volume of ammonia water. The preparation was kept uniform throughout the addition by agitation. When all the ammonia water is added quickly it is difficult to get good stirring.

The resultant product was then diluted with one and one-quarter times its volume of water, stirred to uniformity and allowed to settle. After three and one-half hours the supernatant liquid was siphoned off and an equal volume of ammonia water (20 cc. concentrated NH4OH per liter of water) added. The resultant was mixed thoroughly, allowed to stand about three hours and the clear liquid again siphoned off. The washing operation was repeated and the product filtered on a Buchner type funnel.

The filter cake was dried in porcelain pans or trays for 16 hours at 70° C. The dried material was powdered.

The dry powder was placed in a glass ceramic lined container, placed under a vacuum and raised to and maintained at 200° C. until most of the water was driven off. The temperature was then raised to 325° C. and there maintained for one to two hours and allowed to cool, resulting in the formation of active $UO_3$.

In the manufacture of the uranium nitrate, compounds other than uranium dioxide, for example, uranium trioxide ($UO_3$) and uranous-uranic oxide ($U_3O_8$) may be used. Also, instead of converting the raw material to uranyl nitrate in the process described this material may be converted to the acetate, chloride, sulfate, etc. if desired, which material is then subjected to the hydrogen peroxide treatment prescribed.

The flow diagram in the single figure of the drawing illustrates the general features of the improved process and various modifications and equivalents will be obvious to those skilled in the art. There is no need to lengthen this specification by including such material.

A satisfactory explanation for the tremendous increase in reactivity of the uranium trioxide as a result of treating the uranium tetraoxide with ammonia water is not at present available.

Probably many apparently widely different embodiments of this invention may be made without departing from the principle, breadth and spirit thereof and it is to be understood therefore that this invention is not limited to the specific embodiments thereof except as encompassed in the claims.

What is claimed is:

1. The process which comprises washing uranium tetraoxide with ammonium hydroxide, separating the uranium tetraoxide and heating to convert it to uranium trioxide.

2. In the manufacture of uranium trioxide the steps of treating an aqueous suspension of uranium tetraoxide with aqueous ammonium hydroxide and thereafter heating the uranium tetraoxide to form uranium trioxide.

3. Process of manufacturing highly reactive uranium trioxide comprising washing uranium tetraoxide with dilute ammonium hydroxide, filtering, drying at 70° to 80° C. for 12 to 16 hours, powdering, dehydrating at 200° C. and heating at 325 C. for 1 to 2 hours to form uranium trioxide.

4. Method of manufacturing uranium trioxide capable of rapid reaction with carbon tetrachloride which comprises slurrying uranium tetraoxide with ammonia water, decanting, washing with ammonia water, separating the solid uranium tetraoxide and heating to convert to uranium trioxide.

5. In the manufacture of uranium trioxide the steps of treating uranium tetraoxide with aqueous solutions of ammonium hydroxide of progressively decreasing strength, and thereafter heating the uranium tetraoxide to form uranium trioxide.

6. In the manufacture of uranium trioxide the steps of successively treating uranium tetraoxide with a plurality of dilute aqueous solutions of ammonium hydroxide, and thereafter heating the uranium tetraoxide to form uranium trioxide.

7. The process comprising washing uranium tetraoxide with ammonium hydroxide.

8. The process comprising successively treating freshly precipitated uranium tetraoxide with a plurality of aqueous solutions of ammonium hydroxide.

References Cited in the file of this patent

Mellor: "Inorganic and Theoretical Chemistry," vol. 12, pages 55, 69 and 70. Longmans, London (1932).